(12) United States Patent
Mazanek et al.

(10) Patent No.: US 9,809,190 B2
(45) Date of Patent: Nov. 7, 2017

(54) METHOD OF PACKAGING AN AIR-BAG

(71) Applicant: Autoliv Development AB, Vargarda (SE)

(72) Inventors: Jan Mazanek, Billdal (SE); Tetsuya Matsushita, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/912,470

(22) PCT Filed: Aug. 18, 2014

(86) PCT No.: PCT/GB2014/052525
§ 371 (c)(1),
(2) Date: Feb. 17, 2016

(87) PCT Pub. No.: WO2015/028780
PCT Pub. Date: Mar. 5, 2015

(65) Prior Publication Data
US 2016/0200287 A1    Jul. 14, 2016

(30) Foreign Application Priority Data

Aug. 28, 2013   (GB) .................................. 1315297.0
Aug. 28, 2013   (JP) ................................ 2013-177418

(51) Int. Cl.
*B60R 21/237*        (2006.01)
*B60R 21/36*         (2011.01)

(52) U.S. Cl.
CPC ............ *B60R 21/237* (2013.01); *B60R 21/36* (2013.01)

(58) Field of Classification Search
CPC ............................. B60R 21/237; B60R 21/36
See application file for complete search history.

(56) References Cited

U.S. PATENT DOCUMENTS 5,178,407 A * 1/1993 Kelley ................. B60R 21/237
                                                  280/728.1
5,324,070 A * 6/1994 Kitagawa ............. B60R 21/206
                                                  280/730.1
5,348,341 A    9/1994 Webber
(Continued)

FOREIGN PATENT DOCUMENTS

CN      101374699 A    2/2009
JP      2006-069291 A  3/2006
(Continued)

OTHER PUBLICATIONS

International Search Report and Written Opinion of the ISA, ISA/EP, Rijswijk, NL, dated Nov. 5, 2014.
(Continued)

*Primary Examiner* — Laura Freedman
(74) *Attorney, Agent, or Firm* — Stephen T. Olson; Harness, Dickey & Pierce, P.L.C.

(57) ABSTRACT

A method of packaging an air-bag includes providing an air-bag having a base. A first part of the air-bag is folded at least partly towards the base of the air-bag and additionally folded such that the first part of the air-bag incorporates at least one Z-fold. The first part of the air-bag and a second part of the air-bag are at least partly rolled towards the base of the air-bag to package the air-bag.

25 Claims, 11 Drawing Sheets

(56) References Cited

U.S. PATENT DOCUMENTS

| | | | | |
|---|---|---|---|---|
| 5,501,489 A * | 3/1996 | Folsom | B60R 21/237 | 280/743.1 |
| 5,730,463 A * | 3/1998 | Fisher | B60R 21/207 | 280/728.1 |
| 5,865,466 A * | 2/1999 | Yamamoto | B60R 21/201 | 280/743.1 |
| 5,906,395 A * | 5/1999 | Isaji | B60R 21/207 | 280/728.2 |
| 6,110,094 A * | 8/2000 | Wallentin | B60R 21/237 | 280/728.1 |
| 6,176,509 B1 * | 1/2001 | Kawaguchi | B60R 21/237 | 280/728.1 |
| 6,196,585 B1 * | 3/2001 | Igawa | B60R 21/237 | 280/728.1 |
| 6,206,409 B1 * | 3/2001 | Kato | B60R 21/201 | 280/728.2 |
| 6,299,202 B1 * | 10/2001 | Okada | B60R 21/233 | 280/732 |
| 6,364,348 B1 * | 4/2002 | Jang | B60R 21/201 | 280/730.2 |
| 6,471,238 B2 * | 10/2002 | Ishikawa | B60R 21/21656 | 280/728.3 |
| 6,631,776 B1 * | 10/2003 | Bomya | B60R 21/013 | 180/169 |
| 6,832,779 B2 * | 12/2004 | Tajima | B60R 21/231 | 280/740 |
| 6,942,245 B2 * | 9/2005 | Takimoto | B60R 21/206 | 280/730.1 |
| 6,962,366 B2 * | 11/2005 | Fukuda | B60R 21/201 | 280/743.1 |
| 7,125,043 B2 * | 10/2006 | Amamori | B60R 21/201 | 280/728.2 |
| 7,185,913 B2 * | 3/2007 | Bakhsh | B60R 21/02 | 280/730.1 |
| 7,223,224 B2 * | 5/2007 | Card | B60R 21/237 | 280/728.1 |
| 7,445,239 B2 * | 11/2008 | Okada | B60R 21/237 | 280/743.1 |
| 7,584,988 B2 * | 9/2009 | Okamoto | B60R 21/36 | 180/274 |
| 7,631,892 B2 * | 12/2009 | Ishikawa | B60R 21/237 | 280/728.1 |
| 7,641,220 B2 | 1/2010 | Visker et al. | | |
| 8,360,466 B2 * | 1/2013 | Kino | B60R 21/231 | 280/730.2 |
| 8,500,165 B2 * | 8/2013 | Kwon | B60R 21/239 | 280/738 |
| 8,517,417 B2 * | 8/2013 | Fujita | B60R 21/205 | 280/732 |
| 8,523,223 B2 * | 9/2013 | Miyata | B60R 21/233 | 280/732 |
| 8,540,276 B2 * | 9/2013 | Schneider | B60R 21/206 | 280/730.1 |
| 8,714,587 B2 * | 5/2014 | Nakamura | B60R 21/213 | 280/730.2 |
| 9,346,432 B2 * | 5/2016 | Sugimoto | B60R 21/237 | |
| 2004/0251668 A1 | 12/2004 | Schneider et al. | | |
| 2004/0251669 A1 * | 12/2004 | Fischer | B60R 21/237 | 280/743.1 |
| 2007/0182142 A1 | 8/2007 | Schimpff et al. | | |
| 2008/0217896 A1 | 9/2008 | Visker | | |
| 2016/0031403 A1 * | 2/2016 | Emambakhsh | B60R 21/213 | 280/728.2 |

FOREIGN PATENT DOCUMENTS

| | | |
|---|---|---|
| JP | 2007-238098 A | 9/2007 |
| WO | WO-2008/109396 A2 | 9/2008 |

OTHER PUBLICATIONS

Chinese Notification of First Office Action, issued by SIPO, corresponding to Chinese Application No. 201480046727.1, dated Dec. 27, 2016.

* cited by examiner

METHOD OF PACKAGING AN AIR-BAG

CROSS-REFERENCE TO RELATED APPLICATIONS

This application is a 371 U.S. National Stage of International Application No. PCT/GB2014/052525, filed Aug. 18, 2014. This application claims the benefit of and priority to British Patent Application No. 1315297.0, filed Aug. 28, 2013 and Japanese Patent Application 2013-177418, filed Aug. 28, 2013. The disclosures of the above applications are incorporated herein by reference.

FIELD

The present invention relates to a method of packaging an air-bag, and more particularly relates to a method of packaging a pedestrian-protecting air-bag.

BACKGROUND

Referring to FIG. 1 of the accompanying drawings, it is known to mount a pedestrian-protecting air-bag 1 in a vehicle 2 beneath a rear part of the vehicle's bonnet 3. The air-bag 1 is mounted adjacent the windscreen 4 of the vehicle 2. The air-bag 1 is configured to be inflated in the event that the vehicle 2 collides with a pedestrian. The air-bag 1 inflates to the state shown in FIG. 1 in which first and second side wing portions 5, 6 of the air-bag 1 at least partly cover the A-pillars 7, 8 of the vehicle 2. The inflated air-bag 1 provides a cushion which minimises the likelihood of the head or torso of the pedestrian striking the windscreen 4 or the A-pillars 7, 8 of the vehicle 2. The air-bag 1 thereby minimises the risk of injury to the pedestrian.

A conventional pedestrian-protecting air-bag is normally folded tightly and held within a housing so that the air-bag occupies as little space as possible in the vehicle when the air-bag is not inflated. One disadvantage of folding the air-bag tightly is that, in some situations the tight folds in the fabric of the air-bag restrict the inflation of the air-bag. This can increase the inflation time and distort the shape of the air-bag as the air-bag inflates.

SUMMARY

The present invention seeks to provide an improved method of packaging an air-bag.

According to one aspect of the present invention, there is provided a method of packaging an air-bag, the method comprising: providing an air-bag incorporating a base, folding a first part of the air-bag at least partly towards the base of the air-bag, and rolling the folded first part of the air-bag and a second part of the air-bag at least partly towards the base of the air-bag to package the air-bag.

According to another aspect of the present invention, there is provided a method of packaging an air-bag, the method comprising providing an air-bag incorporating a base, folding a first part of the air-bag at least partly towards the base of the air-bag and additionally folding the first part of the air-bag such that the first part of the air-bag incorporates at least one Z-fold, and rolling the folded first part of the air-bag and a second part of the air-bag at least partly towards the base of the air-bag to package the air-bag.

Preferably, the air-bag is a pedestrian-protecting air-bag.

Conveniently, the base of the air-bag comprises an inlet to be connected to a source of gas.

Advantageously, folding the first part of the air-bag reduces the overall length of the base of the air-bag.

Preferably, the method further comprises folding the second part of the air-bag to reduce the overall size of the second part of the airbag.

Conveniently, the method further comprises additionally folding the second part of the air-bag such that the second part of the air-bag incorporates at least one additional Z-fold.

Preferably, the or each additional fold is adjacent the inlet of the air-bag.

Conveniently, the first part of the air-bag comprises two spaced apart regions which project away from the base of the air-bag on either side of the second part of the air-bag.

In one embodiment, the rolling is performed in a first direction and the method further comprises rolling a further part of the air-bag in a second direction which is opposite to the first direction.

Preferably, the method further comprises tucking one portion of the air-bag into another portion of the air-bag.

Preferably, the method further comprises attaching a retainer element to the rolled air-bag to retain the air-bag in the packaged condition.

Conveniently, the retainer element is a breakable thread and the step of providing the retainer element comprises stitching at least part of the air-bag with the breakable thread.

Advantageously, the step of rolling comprises rolling the air-bag using an apparatus for rolling an inflatable curtain air-bag.

Preferably, the method further comprises inserting at least part of the air-bag into a housing.

According to another aspect of the present invention, there is provided a packaged air-bag for use in a vehicle, the air-bag comprising a base which incorporates an inlet, a first part of the air-bag being folded towards the base of the air-bag and the first part of the air-bag and a second part of the air-bag being at least partly rolled, wherein, in use, gas introduced into the air-bag through the inlet exerts a force which at least partly unrolls the air-bag and then subsequently at least partly unfolds the air-bag.

According to a further aspect of the present invention, there is provided a packaged air-bag for use in a vehicle, the air-bag comprising a base which incorporates an inlet, a first part of the air-bag being folded towards the base of the air-bag and additionally folded to incorporate at least one Z-fold, the first part of the air-bag and a second part of the air-bag being at least partly rolled, wherein, in use, gas introduced into the air-bag through the inlet exerts a force which at least partly unrolls the air-bag and then subsequently at least partly unfolds the air-bag.

Advantageously, the air-bag is a pedestrian-protecting air-bag.

Preferably, the inlet is connected to a source of gas.

Conveniently, the overall length of the base of the air-bag is reduced by the fold in the first part of the air-bag.

Advantageously, the overall size of the second part of the air-bag is reduced by an additional fold.

Preferably, the second part of the air-bag is folded with an additional fold to produce a Z-fold in the second part of the air-bag.

Conveniently, the or each additional fold is adjacent the inlet of the air-bag.

Preferably, the first part of the air-bag comprises two spaced apart regions which project away from the base of the air-bag on either side of the second part of the air-bag.

Conveniently, the second part of the air-bag is at least partly rolled in a first direction and a further part of the air-bag is at least partly rolled in a second direction which is opposite to the first direction.

Advantageously, one part of the air-bag is tucked into another part of the air-bag.

Preferably, the air-bag is retained in the packaged condition by a retainer element.

Conveniently, the retainer element is a breakable thread which is stitched to at least part of the air-bag.

According to a further aspect of the present invention, there is provided an air-bag module comprising a housing containing at least part of a packaged air-bag.

BRIEF DESCRIPTION OF THE DRAWINGS

So that the present invention may be more readily understood, embodiments of the present invention will now be described, by way of example, with reference to the accompanying drawings, in which:

FIG. 9 is a view corresponding to FIG. 8 with corner sections of the air-bag 9 tucked in.

DETAILED DESCRIPTION

Figure 1:
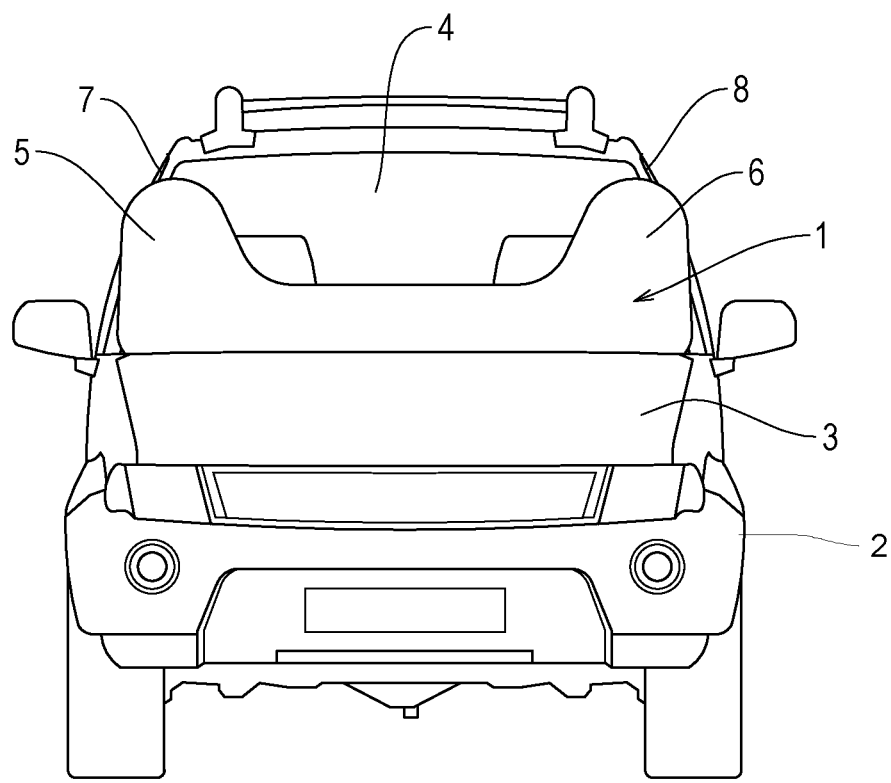
FIG. 1 is a diagrammatic view of an inflated pedestrian-protecting air-bag mounted to a vehicle.
Figure 2:
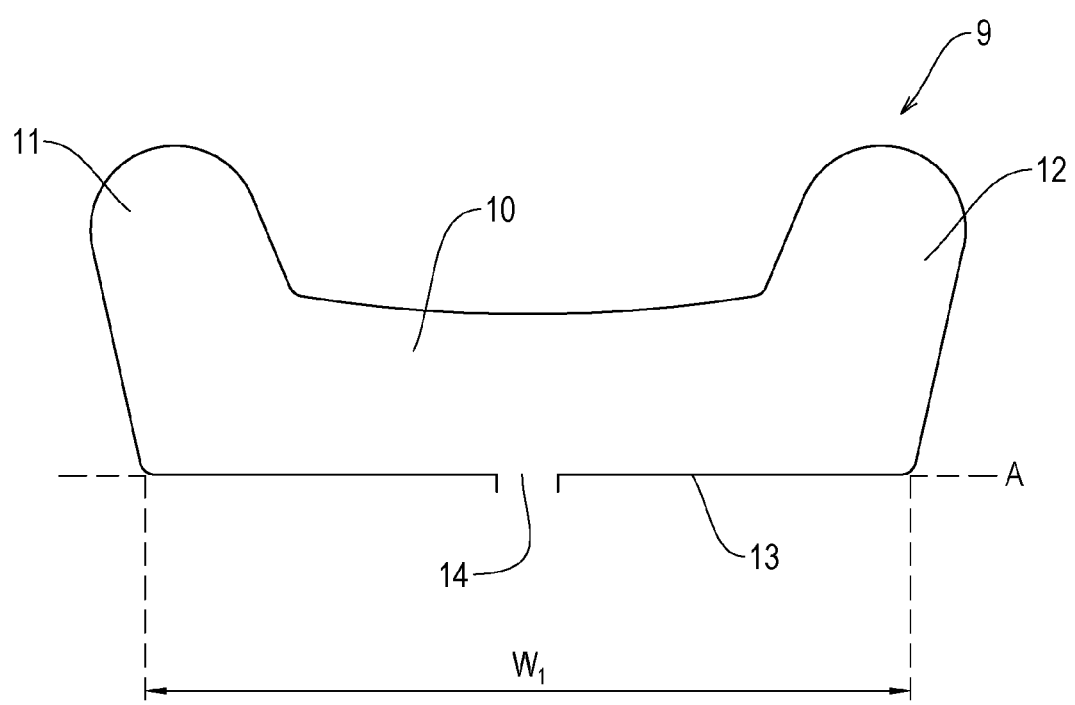
FIG. 2 is a diagrammatic view of an unpackaged pedestrian-protecting air-bag.

Referring now to FIG. 2 of the accompanying drawings, in a preferred embodiment an air-bag 9 for use in a vehicle safety arrangement is at least partly formed from fabric. The air-bag 9 incorporates a central inflatable portion 10 and two inflatable side wing portions 11, 12. In one embodiment, the air-bag 9 is a pedestrian-protecting air-bag which is configured to be inflated to at least partly cover the windscreen and the A-pillars of a vehicle, as shown in FIG. 1.

The air-bag 9 incorporates a base 13 that is provided with an inlet 14 which is configured to be connected to a source of gas. The base 13 forms part of the lower edge of the air-bag 9 which has a width $W_1$ which is approximately equal to the width of the windscreen of a motor vehicle. An axis A extends along the longitudinal length of the base 13, as shown in FIG. 2.

The inlet 14 is positioned in the base 13 of the air-bag 9 approximately half way along the width $W_1$ of the base 13. A central portion 10 of the air-bag 9 extends away from the inlet 14. The side wing portions 11, 12 are provided on either side of the central portion 10 to extend outwardly, away from the base 13 on either side of the central portion 10.

Figure 3:
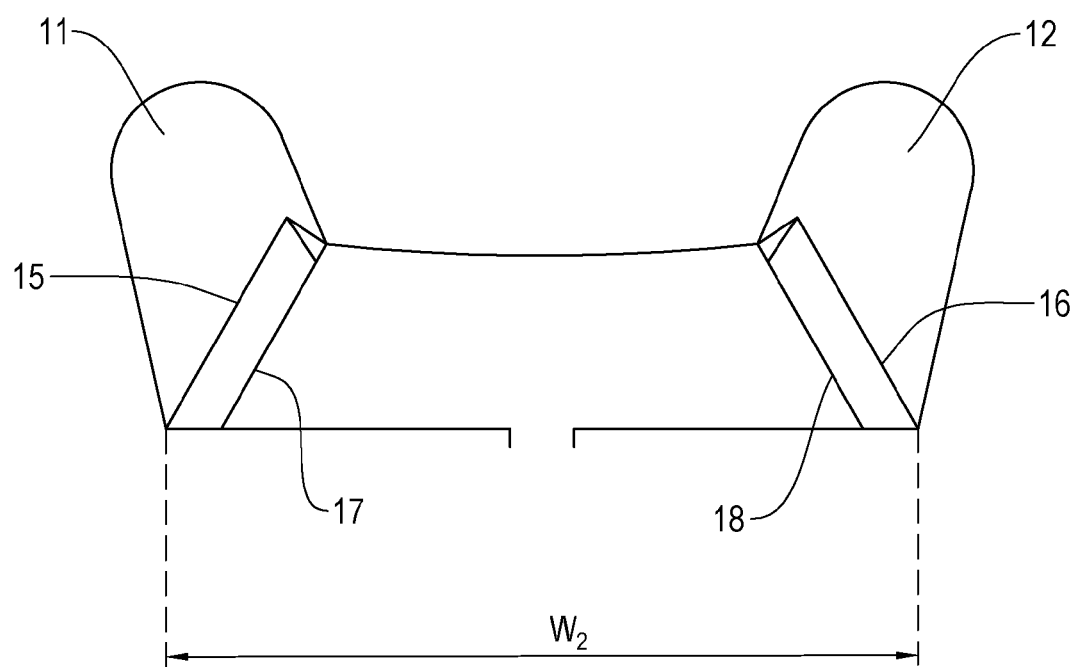
FIG. 3 is a view corresponding to FIG. 2 with parts of the air-bag being folded during an intermediate stage of a method of packaging the air-bag.

Referring to FIG. 3 of the accompanying drawings, in one embodiment a first step of a method of packaging the air-bag 9 comprises folding the side wing portions 11, 12, which form a first part of the air-bag 9, along respective fold lines 15, 16. Each of the fold lines 15, 16 is angled relative to the axis A of the base 13. In one embodiment, the fold lines 15, 16 are angled at 45° relative to the axis A of the base 13.

The folds in the air-bag 9 produced by the fold lines 15, 16 reduce the width of the base 13 and also the overall width of the air-bag 9 from the width $W_1$, shown in FIG. 2 to a smaller width $W_2$, as shown in FIG. 3.

In one embodiment, the method comprises folding the side wing portions 11, 12 along at least two further fold lines 17, 18, as shown in FIG. 3. The additional fold lines produce Z-folds in the air-bag 9. The Z-folds fold the portions of the air-bag 9 against one another to reduce the overall width of the air-bag 9.

Figure 4:
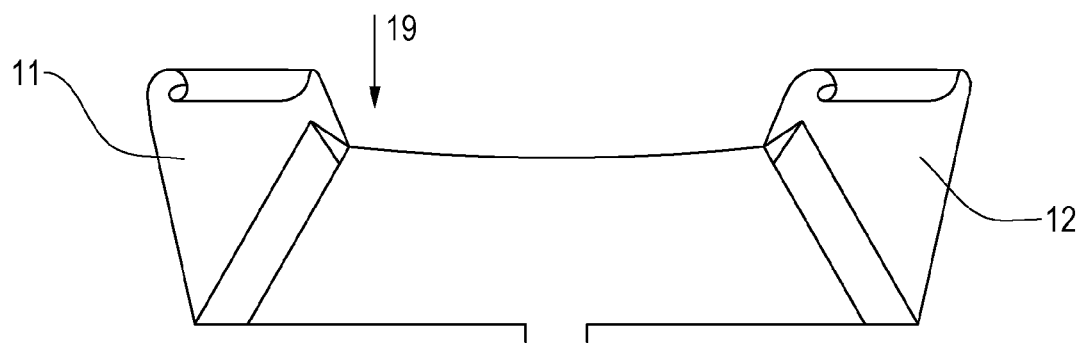
FIG. 4 is a view corresponding to FIG. 3 with side wing portions of the air-bag being rolled during an intermediate stage of the method of packaging the air-bag.
Figure 5:
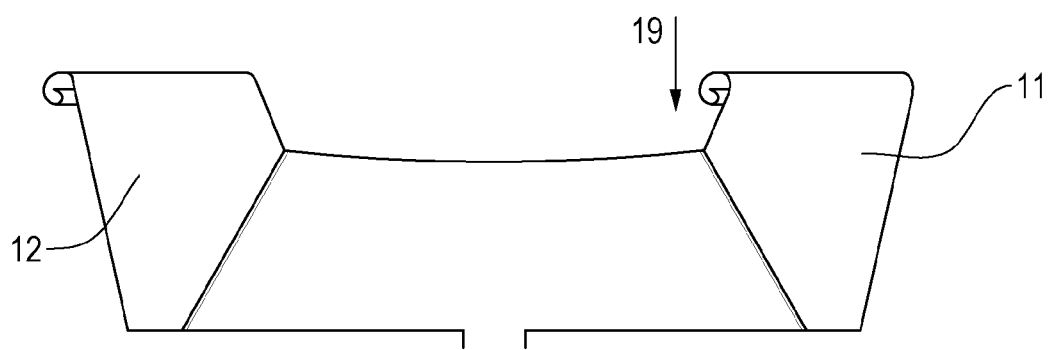
FIG. 5 is a view corresponding to FIG. 4 showing the opposing side of the air-bag.
Figure 6:
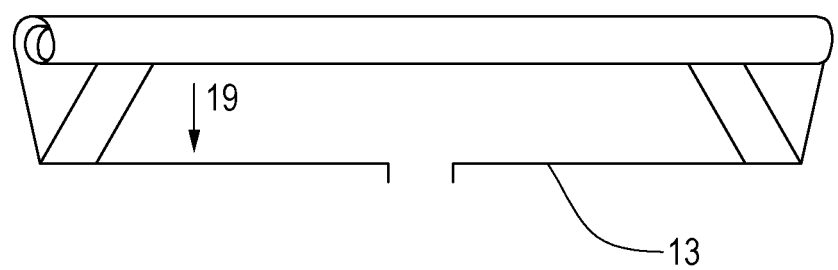
FIG. 6 is a view corresponding to FIG. 3 with the air-bag being rolled during a subsequent stage of the method of packaging the air-bag.

After the folding steps are complete, an intermediate roll step is performed in which the first part of the air-bag 9 formed by the side wing portions 11, 12 is rolled up towards the base 13 in a direction indicated by the arrow 19, as shown in FIGS. 4 and 5. The intermediate roll step continues by rolling the side wing portions 11, 12 and a second part of the air-bag 9 formed by the central portion 10 of the air-bag 9 towards the base 13 in a direction indicated by the arrow 19, as shown in FIG. 6. In one embodiment, the rolling step occurs after all folding steps have been carried out. The air-bag is in a packaged condition once the rolling step is complete.

Figure 7:
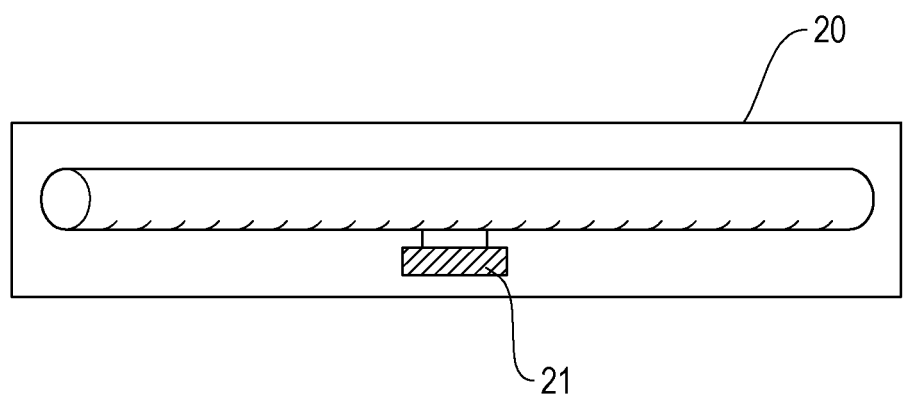
FIG. 7 is a diagrammatic view of the air-bag of FIG. 2 with the air-bag packaged within a housing.

Referring now to FIG. 7 of the accompanying drawings, in one embodiment a retainer element is fixed to the rolled air-bag 9 to retain the air-bag 9 in the packaged condition. In one embodiment, the retainer element is a thread which is sewn to the rolled air-bag 9 to hold the air-bag 9 in the packaged condition. The retainer element is configured to break as gas is introduced into the air-bag 9 to allow the air-bag 9 to inflate.

In one embodiment the packaged air-bag 9 is at least partly inserted into a housing 20, as shown in FIG. 7. The inlet 14 of the air-bag 9 may also be connected to a source of gas, such as an inflator 21.

When the air-bag 9 is inflated by a source of gas, the air-bag 9 initially unrolls as it expands due to the forces exerted by the gas on the interior of the air-bag 9. The air-bag 9 begins to unfold about the fold lines 15-18 after the air-bag 9 has at least partly unrolled. The initial unrolling of the air-bag 9 minimises the possibility of the folded portions of the air-bag 9 becoming locked and not expanding in the correct manner. The initial unrolling of the air-bag 9 during inflation provides a passage for the gas which is injected into the air-bag 9 to act on and unfold the folded portions of the air-bag 9. The configuration of the packaged air-bag 9 therefore allows quick and uniform inflation of the air-bag 9.

A further benefit of the packaged air-bag 9 and the method of packaging the air-bag 9 is that the air-bag 9 can be packaged and retained in the packaged condition by an attachment arrangement before being inserted into a housing. This is beneficial because it allows the air-bag 9 to be produced and packaged at one manufacturing location and then transported in the packaged condition to another manufacturing location for subsequent assembly within an air-bag module.

Figure 8:
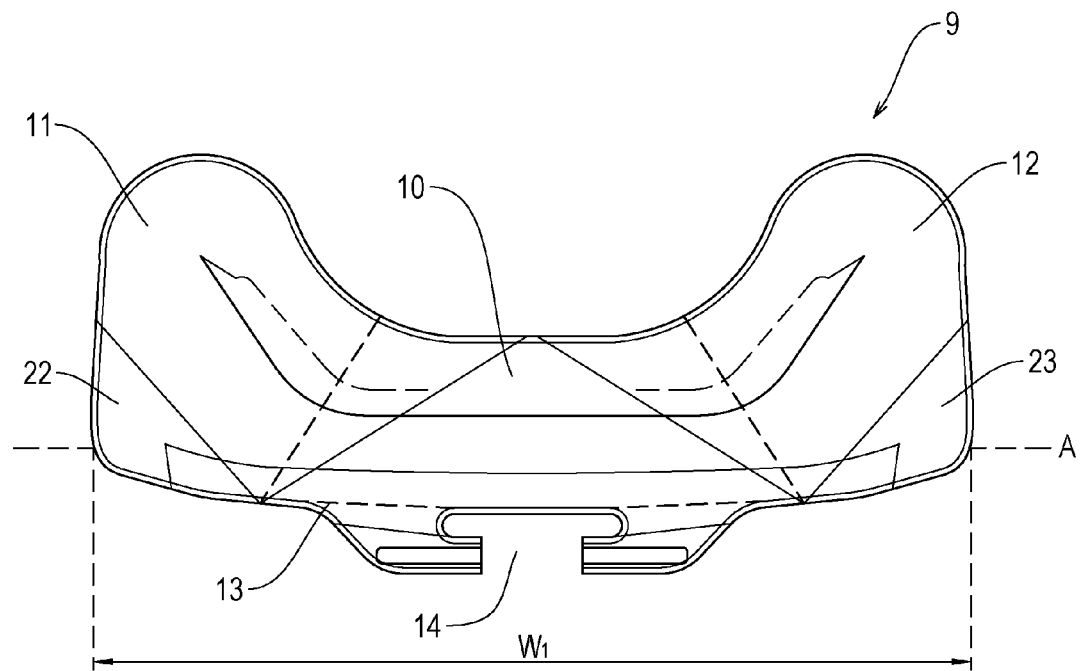
FIG. 8 is a diagrammatic view of an unpackaged pedestrian-protecting air-bag during an initial step of a method of a further embodiment of the invention.

Referring now to FIG. 8 of the accompanying drawings, a method of a further embodiment of the invention comprises packaging an air-bag of the same type as the air-bag 9 described above. The same reference numerals will be used for corresponding elements of the air-bag to the elements of the air-bag described above.

Figure 9:
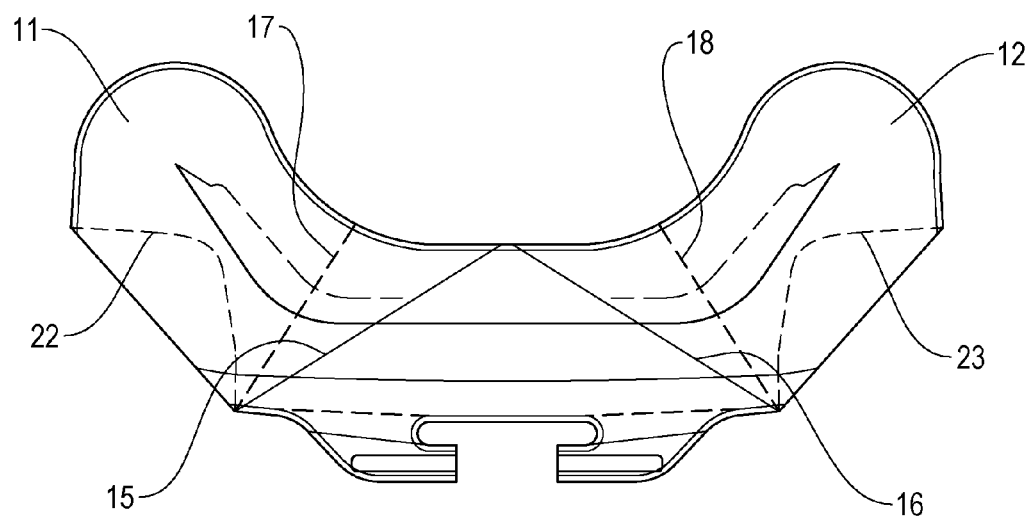

The method of this further embodiment comprises initially tucking in the lower corner sections 22, 23 of the air-bag 9. The tucked-in corner sections 22, 23 are turned inside out to project into the body of the air-bag 9, between the fabric forming the lower part of the side wing portions 11, 12, as shown in dotted line in FIG. 9.

Figure 10:
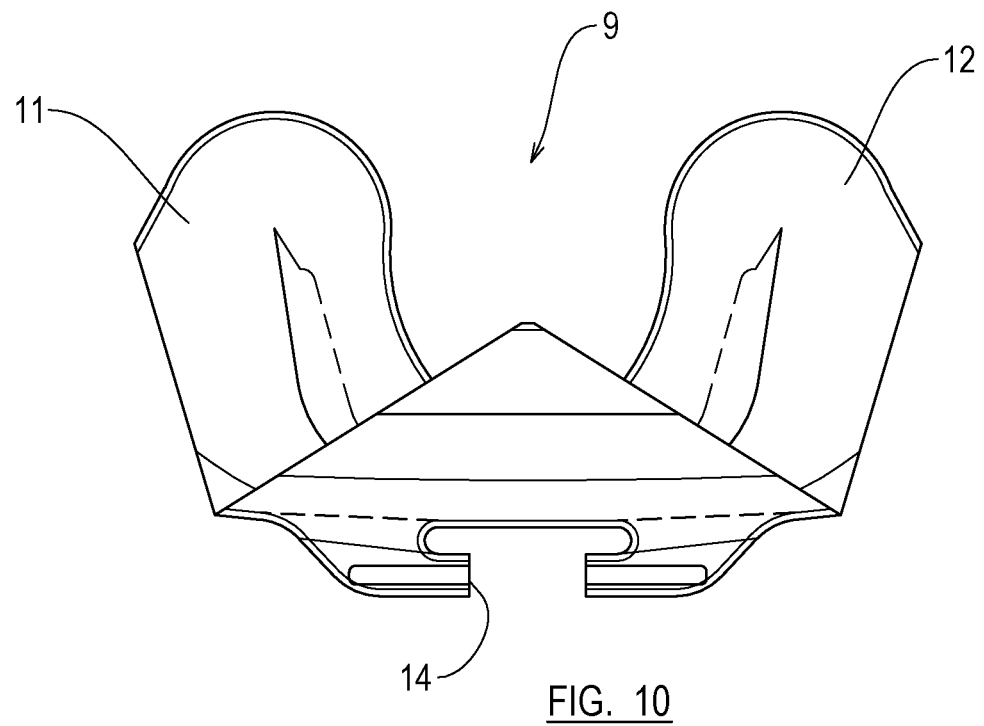
FIG. 10 is a view corresponding to FIG. 9 showing the air-bag after being folded.

The air-bag 9 is folded about fold lines 15-18 in the same manner as described above to reduce the overall width of the air-bag 9. In this embodiment, since the lower corner sections 22, 23 are tucked in to the air-bag 9, the side edges of the air-bag 9 become substantially parallel to one another after the air-bag 9 is folded along the fold lines 15-18, as shown in FIG. 10.

Figure 11:
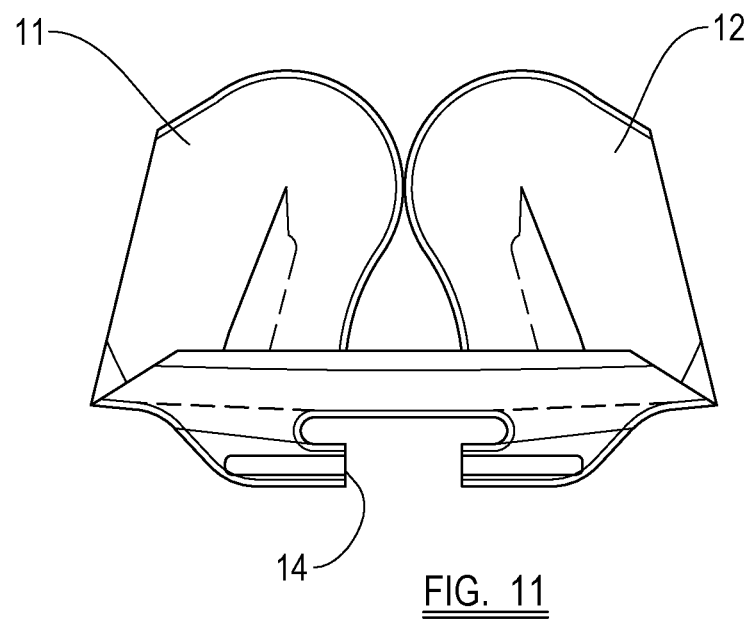
FIG. 11 is a view corresponding to FIG. 10 showing part of the air-bag being rolled in a first rolling step.

The next step of the method of packaging the air-bag 9 of this preferred embodiment comprises rolling the central portion 10 and the folded parts of the side wing portions 11, 12 of the air-bag 9. In this embodiment, the rolling is inboard rolling whereby the initial roll direction is towards the plane of the side wing portions 11, 12. This first rolling step is carried out until the middle portion of the air-bag 9 is rolled up against the inlet 14, as shown in FIG. 11.

Figure 12:
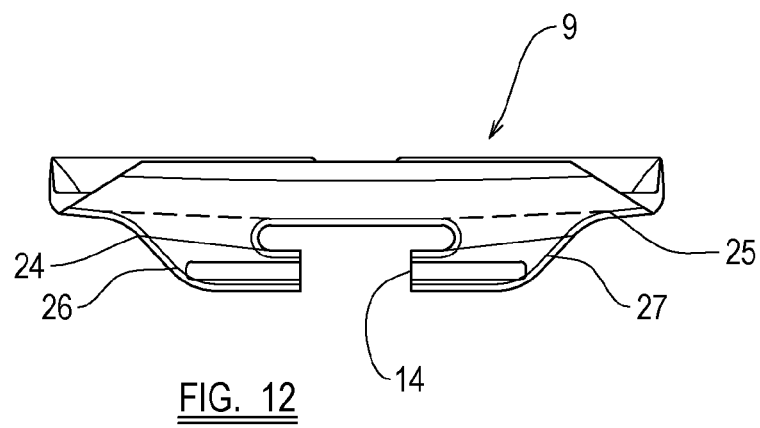
FIG. 12 is a view corresponding to FIG. 11 showing the air-bag 9 after a second rolling step.

A second rolling step is then performed to roll the side wing portions 11, 12 towards the inlet 14. In this embodiment, the side wing portions 11, 12 are rolled in an outboard direction which is opposite to the inboard rolling direction that was performed in the first rolling step. The side wing portions 11, 12 are rolled to sit adjacent the inlet 14, as shown in FIG. 12.

Figure 13:
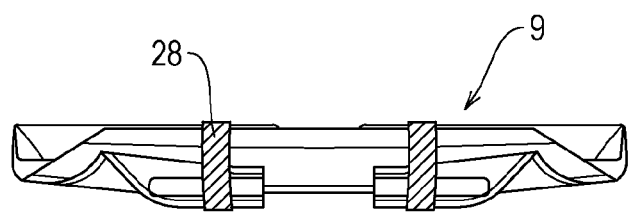
FIG. 13 is a view corresponding to FIG. 12 with an inlet portion being folded.

In this embodiment, the portions of the air-bag 9 which form the inlet 14 are folded about fold lines 24-27 to form Z-folds so that the inlet 14 is packaged adjacent the other sections of the air-bag 9, as shown in FIG. 13. The air-bag 9 is thus packaged into an elongate form of substantially uniform thickness which may be housed easily within a uniform housing.

In this embodiment, a retainer element in the form of a retainer tape 28 is wrapped at least partly around the packaged air-bag 9 to retain the air-bag 9 in the packaged condition.

Figure 14:
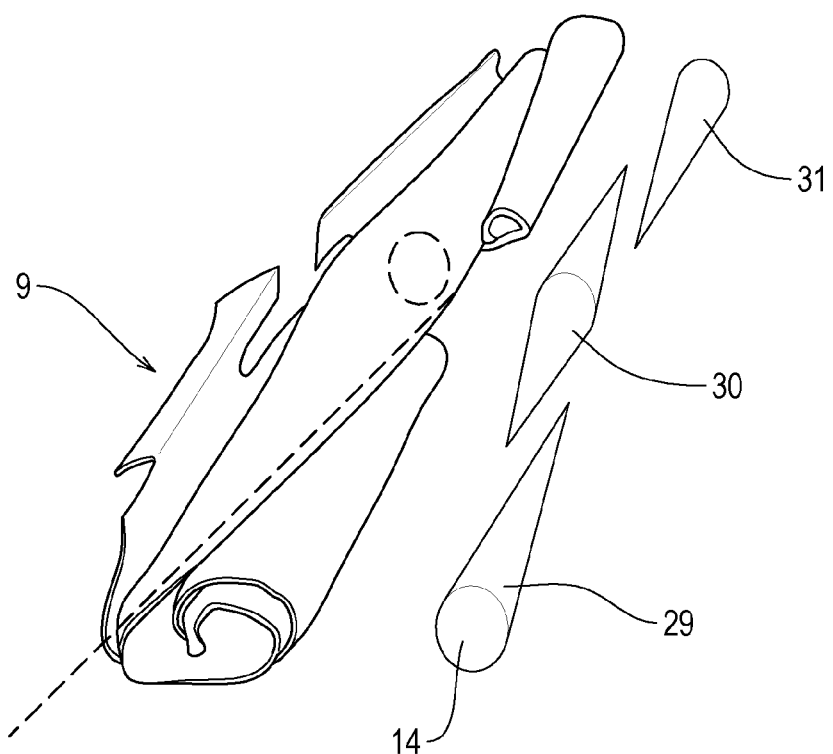
FIG. 14 is a view corresponding to FIG. 13 showing a representation of the roll distribution of the packaged air-bag.

Referring now to FIG. 14 of the accompanying drawings, the approximate roll distribution of the packaged air-bag 9 is represented by generally frusto-conical indicators 29-31. The indicators 29-31 demonstrate the approximately constant thickness of the packaged air-bag 9 which is a result of the two roll steps that are performed on the air-bag 9.

This further embodiment of the invention provides the packaged air-bag 9 with an approximately constant thickness which is compact and easy to house. Furthermore, the packaged air-bag 9 may be deployed rapidly due to the air-bag initially unrolling and then subsequently unfolding during deployment.

Figure 15:
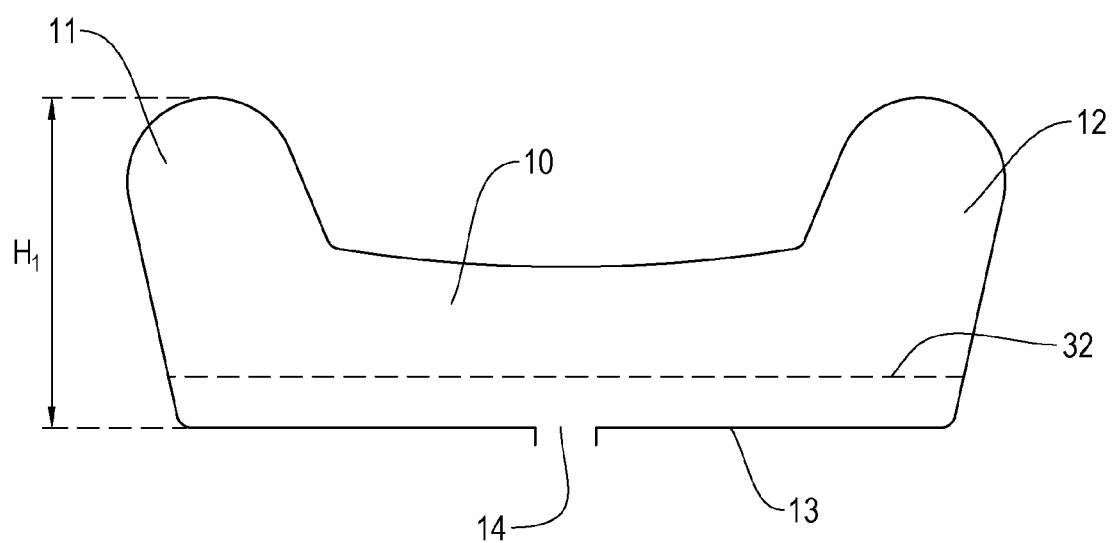
FIG. 15 is a diagrammatic view of an unpackaged pedestrian-protecting air-bag of a method of a yet further embodiment of the invention.

Referring now to FIG. 15 of the accompanying drawings, a method of a yet further embodiment of the invention comprises packaging an air-bag of the same type as the air-bag 9 described above. The same reference numerals will be used for corresponding elements of the air-bag to the elements of the air-bag described above.

The method of this yet further embodiment comprises an additional folding step which folds the air-bag 9 along the line of a first additional fold 32. The first additional fold 32 extends at least partly across the central portion 10 of the air-bag 9. The first additional fold 32 is adjacent the inlet 14 of the air-bag 9.

Figure 16:
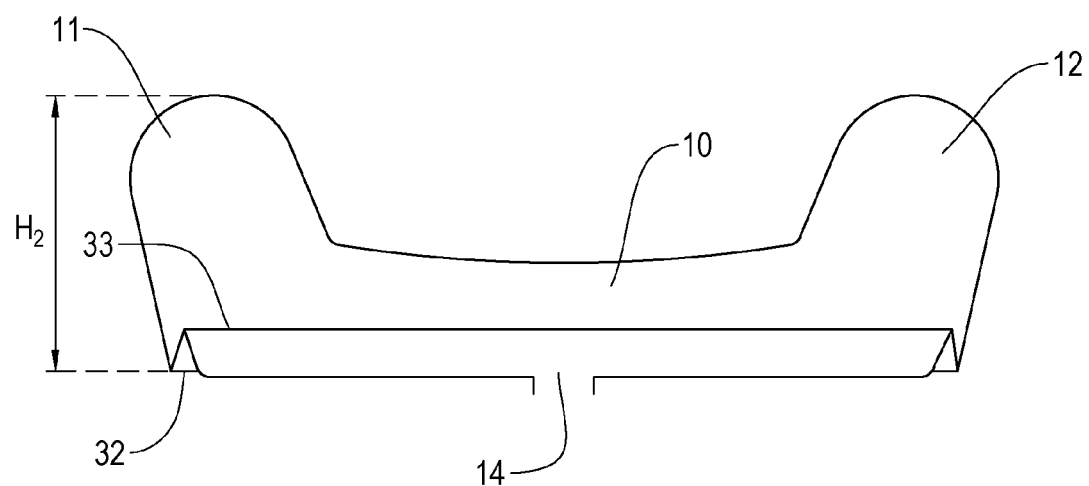
FIG. 16 is a view corresponding to FIG. 15 showing the air-bag comprising two additional folds.

Referring now to FIG. 16 of the accompanying drawings, in this yet further embodiment, the method comprises a second additional folding step in which the air-bag 9 is folded along the line of a second additional fold 33. In this embodiment, the line of the second additional fold 33 is exactly or substantially parallel to the line of the first additional fold 32. The first and second additional folds 32, 33 reduce the overall size of the air-bag 9 from a first size $H_1$ to a second size $H_2$.

In this yet further embodiment of the invention, the first and second additional folds 32, 33 form a Z-fold in the air-bag 9. However, in still further embodiments of the invention, there is only one additional fold 32 which does not form a Z-fold. In other embodiments, there are more than two additional folds adjacent the inlet 14 to further reduce the overall size of the air-bag 9.

It is to be appreciated that the embodiments described above and shown in FIGS. 2-14 may incorporate one or both of the additional folds 32, 33.

When the air-bag 9 is inflated, the additional folds 32, 33 are unfolded by the force of gas introduced into the inlet 14 during an early stage of inflation of the air-bag 9. As the additional folds 32, 33 unfold, the central portion 10 of the air-bag 9 moves away from the inlet 14 to a position which at least partly covers the windscreen wipers of the vehicle to which the air-bag 9 is mounted. The air-bag 9 provides a cushion which at least partly covers the windscreen wipers of the vehicle during an early stage of inflation of the air-bag 9. This minimises the risk of a pedestrian striking the windscreen wipers of the vehicle during a crash situation.

When used in this specification and the claims, the term "comprises" and "comprising" and variations thereof mean that specified features, steps or integers and included. The terms are not to be interpreted to exclude the presence of other features, steps or compounds.

The invention claimed is:

1. A method of packaging an air-bag, the method comprising:
   providing an air-bag having a base, the base having a base axis extending along a longitudinal length thereof;
   folding a first part of the air-bag at least partly towards the base of the air-bag and additionally folding the first part of the air-bag such that the first part of the air-bag defines at least one Z-fold; and
   rolling the folded first part of the air-bag and a second part of the air-bag at least partly towards the base of the air-bag to package the air-bag, wherein the Z-fold extends along a line oblique to the base axis,
   wherein the base of the air-bag includes an inlet extending along an inlet access for connecting to a source of gas; the inlet access being oblique to the line along which the Z-fold extends.

2. The method of claim 1, wherein the air-bag is a pedestrian-protecting air-bag having a central portion having a first height measured from a lower end of the base and first and second lateral sides each having a second height greater than the first height.

3. The method of packaging an air-bag of claim 2, wherein the line along which the Z-fold extends passes through an intersection of the first lateral side and the central portion at an upper end of the air-bag.

4. The method of claim 1, wherein the method further comprises:
folding the second part of the air-bag to reduce an overall size of the second part of the air-bag.

5. The method of claim 1, wherein the first part of the air-bag comprises two spaced apart regions which project obliquely from the base of the air-bag on either side of the second part of the air-bag.

6. The method of claim 1, wherein rolling the folded first part is performed in a first direction and the method further comprises rolling a further part of the air-bag in a second direction which is opposite to the first direction.

7. The method of claim 1, further comprising:
tucking one portion of the air-bag into another portion of the air-bag.

8. The method of claim 1, further comprising:
attaching a retainer element to the rolled air-bag to retain the air-bag in the packaged condition.

9. The method of claim 1, wherein the step of rolling comprises the folded first part rolling the air-bag using an apparatus for rolling an inflatable curtain air-bag.

10. The method of claim 1, further comprising inserting at least part of the air-bag into a housing.

11. A packaged air-bag for use in a vehicle, the air-bag comprising:
a base which incorporates an inlet, the base having a base axis extending along a longitudinal length thereof;
a first part of the air-bag being folded towards the base of the air-bag and additionally folded to define at least one Z-fold, the first part of the air-bag and a second part of the air-bag being at least partly rolled, wherein gas introduced into the air-bag through the inlet exerts a force which at least partly unrolls the air-bag and then subsequently at least partly unfolds the air-bag,
wherein the at least one Z-fold extends along a line oblique to the base axis.

12. The packaged air-bag of claim 11, wherein the air-bag is a pedestrian-protecting air-bag having a central portion having a first height measured from a lower end of the base and first and second lateral sides each having a second height greater than the first height.

13. The packaged air-bag of claim 12, wherein the line along which the at least one Z-fold extends passes through an intersection of the first lateral side and the central portion at an upper end of the air-bag.

14. The packaged air-bag of claim 11, wherein the inlet extending along an inlet access is connected to a source of gas, the inlet access being oblique to the line along which the Z-fold extends.

15. The packaged air-bag of claim 11, wherein an overall size of the second part of the air-bag is reduced by an additional fold.

16. The packaged air-bag of claim 15, wherein the second part of the air-bag is folded with an additional fold to produce a Z-fold in the second part of the air-bag.

17. The packaged air-bag of claim 15, wherein at least one Z-fold is adjacent the inlet of the air-bag.

18. The packaged air-bag of claim 11, wherein the first part of the air-bag comprises two spaced apart regions which project away from the base of the air-bag on either side of the second part of the air-bag.

19. The packaged air-bag of claim 11, wherein the second part of the air-bag is at least partly rolled in a first direction and a further part of the air-bag is at least partly rolled in a second direction which is opposite to the first direction.

20. The packaged air-bag of claim 11, wherein one part of the air-bag is tucked into another part of the air-bag.

21. The packaged air-bag of claim 11, wherein the air-bag is retained in the packaged condition by a retainer element.

22. The packaged air-bag of claim 21 in combination with an air-bag module, the air-bag module having a housing containing at least part of the packaged air-bag.

23. A method of packaging an air-bag, the method comprising:
providing an air-bag having a base,
folding a first part of the air-bag at least partly towards the base of the air-bag and additionally folding the first part of the air-bag such that the first part of the air-bag defines at least a first Z-fold;
rolling the folded first part of the air-bag and a second part of the air-bag at least partly towards the base of the air-bag to package the air-bag; and
folding the second part of the air-bag such that the second part of the air-bag defines at least a second Z-fold.

24. The method of claim 23, wherein at least one of the first and second Z-folds is adjacent an inlet of the air-bag.

25. A method of packaging an air-bag, the method comprising:
providing an air-bag having a base, the base having a base axis extending along a longitudinal length thereof;
folding a first part of the air-bag at least partly towards the base of the air-bag and additionally folding the first part of the air-bag such that the first part of the air-bag defines at least one Z-fold; and
rolling the folded first part of the air-bag and a second part of the air-bag at least partly towards the base of the air-bag to package the air-bag, wherein the Z-fold extends along a line oblique to the base axis,
wherein the air-bag is a pedestrian-protecting air-bag having a central portion having a first height measured from a lower end of the base and first and second lateral sides each having a second height greater than the first height.

* * * * *